United States Patent [19]

Simpson

[11] Patent Number: 5,546,592
[45] Date of Patent: Aug. 13, 1996

[54] SYSTEM AND METHOD FOR INCREMENTING MEMORY ADDRESSES IN A COMPUTER SYSTEM

[75] Inventor: David L. Simpson, West Columbia, S.C.

[73] Assignee: NCR Corporation, Dayton, Ohio

[21] Appl. No.: 371,872

[22] Filed: Jun. 26, 1989

[51] Int. Cl.[6] ............................................. G06F 7/42
[52] U.S. Cl. ................. 395/775; 364/DIG.1; 364/DIG.2
[58] Field of Search ................................ 364/200, 900, 364/DIG.1, DIG.2; 395/375, 800, 325, 275, 250, 400, 425, 550, 775, 500, 575; 340/825.14, 146, 825.52, 142, 825.07, 825.37; 370/102, 37, 24, 112

[56] References Cited

U.S. PATENT DOCUMENTS

| | | | |
|---|---|---|---|
| 4,053,871 | 10/1977 | Vidalin et al. | 340/146.2 |
| 4,177,514 | 12/1979 | Rupp | 364/200 |
| 4,179,746 | 12/1979 | Tubbs | 364/900 |
| 4,190,885 | 2/1980 | Joyce et al. | 364/200 |
| 4,200,936 | 4/1980 | Borzcik et al. | 364/900 |
| 4,240,142 | 12/1980 | Blahut et al. | 395/375 |
| 4,250,545 | 2/1981 | Blahut et al. | 395/375 |
| 4,325,120 | 4/1982 | Colley et al. | 395/375 |
| 4,377,846 | 3/1983 | Yoshida | 395/375 |
| 4,405,983 | 9/1983 | Mendez | 364/200 |
| 4,407,014 | 9/1983 | Holtey et al. | 364/200 |
| 4,407,015 | 9/1983 | Ziobro | 364/200 |
| 4,449,202 | 5/1984 | Knapp et al. | 364/900 |
| 4,511,960 | 4/1985 | Boudreau | 364/200 |
| 4,531,211 | 7/1985 | Hadziomerovic | 370/102 |
| 4,591,979 | 5/1986 | Iwashita | 395/800 |
| 4,594,682 | 6/1986 | Drimak | 395/800 |
| 4,604,695 | 8/1986 | Widen et al. | 364/200 |
| 4,660,143 | 4/1987 | King et al. | 395/325 |
| 4,680,698 | 7/1987 | Edwards et al. | 364/DIG.1 |
| 4,682,281 | 7/1987 | Woffinden et al. | 395/417 |
| 4,694,293 | 9/1987 | Sugiyama et al. | 340/825.68 |
| 4,704,678 | 11/1987 | May | 395/650 |
| 4,715,017 | 12/1987 | Iwahashi | 365/230.08 |
| 4,777,594 | 10/1988 | Jones et al. | 395/375 |
| 4,821,187 | 4/1989 | Ueda et al. | 395/375 |
| 5,006,841 | 4/1991 | Vines et al. | 340/825.07 |
| 5,089,957 | 2/1992 | Stultz et al. | 395/425 |

*Primary Examiner*—Daniel H. Pan
*Attorney, Agent, or Firm*—Douglas S. Foote

[57] ABSTRACT

A system and method for tracking a plurality of addresses. The system comprises a plurality of registers, each register storing a current address and having an input and an output. Each input is connected to a data bus through a first multiplexer and each output is connected to an address bus through a second multiplexer. The system further comprises an adder connected between the address bus and the first multiplexer. The adder increments a current address appearing on the address bus while the address in on the bus and generates a next address.

21 Claims, 1 Drawing Sheet

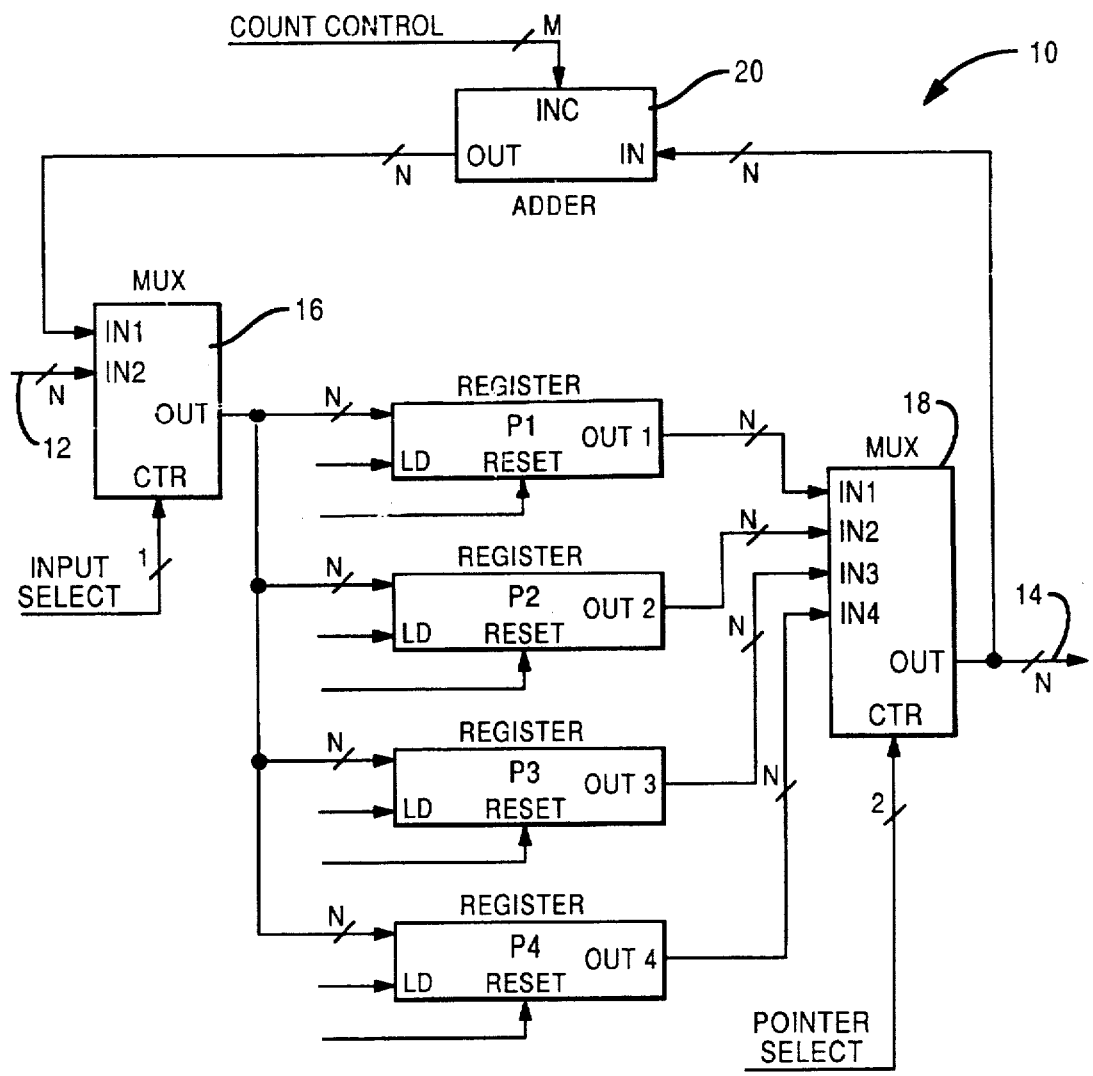

SYSTEM AND METHOD FOR INCREMENTING MEMORY ADDRESSES IN A COMPUTER SYSTEM

The present invention relates generally to a system and method for counting numbers. More particularly, it relates to a system and method for tracking memory addresses in a computer system.

BACKGROUND OF THE INVENTION

It is quite common during the operation of a computer for a number of sequential memory locations to be addressed. For example, during a direct memory access (DMA) transfer, a block of data will be transferred to or from an addressable memory space. To address each memory cell, the starting address and the count (number of sequential locations) are provided. The starting address is placed on the address bus and the first data element is transferred. The address is then automatically incremented as each sequential memory location is addressed. This continues until the number of memory locations addressed equals the count.

Counters have been used in the past to hold the current address. When the current address cycle is complete, a signal is sent to the counter to increment the address stored therein. The counter is then incremented and the next address cycle commences. A disadvantage of using counters in such an application is that they are relatively slow. Since the time required to increment the current address for each address cycle is cumulative such delays can adversely affect system performance.

Another disadvantage of counters is that they are relatively large. This is a particular problem where several counters are required. For example, indirect addressing may require one counter to track the addresses of data blocks stored in a memory map table (hereinafter referred to as a link table) and another counter to track the addresses of data within each data block. As a further example, a number of DMA chips are designed to handle more than one data storage device. Each device has a dedicated channel, with each channel requiring its own counters. Thus, the number of required counters for tracking addresses can escalate depending on the application. The larger number of counters on a chip requires more chip die area.

OBJECTS OF THE INVENTION

It is therefore an object of the present invention to provide a new and improved system for tracking one or more addresses.

It is another object of the present invention to provide a method for tracking addresses.

It is a further object of the present invention to provide a counting system and method for use in a computer system which reduces cycle time and improves performance.

It is yet another object of the present invention to provide an address tracking system for a computer chip.

It is yet a further object of the present invention to provide, for a computer chip, a counting system with reduced chip area.

SUMMARY OF THE INVENTION

One form of the present invention is a system for tracking a plurality of addresses. The system comprises a plurality of registers, each register storing a current address and having an input and an output. Each input is connected to a data bus through a first multiplexer and each output is connected to an address bus through a second multiplexer. The system further comprises an adder connected between the address bus and the first multiplexer for incrementing a current address appearing on the address bus to generate a next address.

Another form of the present invention is a method of changing a plurality of numbers. A first number is loaded into a first register and then provided to a bus. The first number is combined with a first preselected number while the first number is on the bus, and a next first number is generated. The first register is loaded with the next first number. A second register is loaded with a second number and the second number is then provided to the bus. The second number is combined with a second preselected number while the second number is on the bus to generate a next second number. The next second number is then loaded into the second register.

BRIEF DESCRIPTION OF THE DRAWINGS

The figure is a diagram of an address tracking system according to one form of the present invention.

DESCRIPTION OF A PREFERRED EMBODIMENT

The figure shows a system 10, such as may be implemented on a chip, for tracking four addresses. System 10 includes a data bus 12, an address bous 14, registers P1, P2, P3 and P4, multiplexers 16 and 18, and an adder 20. Multiplexer 16 has inputs IN1, IN2 and CTR, and an output labeled OUT. Multiplexer 18 has inputs IN1, IN2, IN3, IN4 and CTR, and an output labeled OUT. Registers P1–P4 have inputs labeled IN1–IN4, respectively, and outputs OUT1–OUT4, respectively. Each of registers P1–P4 also has inputs LD and RESET. Adder 20 has inputs IN and INC and an output labeled OUT.

Inputs IN1–IN4 of registers P1–P4, respectively, are connected to the output OUT of multiplexer 16. The outputs OUT1–OUT4 of registers P1–P4 are connected to inputs IN1–IN4, respectively, of multiplexer 18. Output OUT of multiplexer 18 is connected to address bus 14 and to the IN input of adder 20. Output OUT of adder 20 is connected to input IN1 of multiplexer 16. Data bus 12 is connected to the IN2 input of multiplexer 16.

The CTR input of multiplexer 16 receives an INPUT SELECT control signal for connecting either input IN1 or IN2 to output OUT within multiplexer 16. Similarly, the CTR input of multiplexer 18 receives a POINTER SELECT control signal for connecting one of inputs IN1–IN4 to output OUT within multiplexer 18.

The INC input of adder 20 receives a COUNT CONTROL signal, which in one embodiment represents a preselected number for combining with the number appearing on address bus 14. In general, the subject invention may utilize any device for adder 20 which combines two numbers. For example, in some applications a subtracter may be employed in place of adder 20. The number appearing on the OUT output is the combination (either sum or difference depending upon whether an adder or subtracter, respectively, is utilized) of the numbers appearing on inputs IN and INC. The purpose of adder 20 is to update the address or number appearing on bus 14 by the preselected number on COUNT CONTROL line while the address is on bus 14. As long as the COUNT CONTROL signal is present, the sum will appear on output OUT substantially contemporaneous with the appearance of the address on bus 14.

The LD input of each register P1–P4 receives a control signal for loading that register with the number appearing on the output OUT of multiplexer 16. Typically, only one of the LD inputs of registers will be activated at a time so that a number on output OUT is loaded into only one of the registers P1–P4. The RESET input of each of the registers P1–P4 receives a control signal for resetting that register.

A preferred embodiment of the present invention employs a plurality of registers (such as registers P1–P4). However, one form of the present invention employs a single register. The operation of the present invention as it applies to a single register P1 will now be described. The invention will also be described with respect to an application for tracking addresses. However, it should be understood that the invention applies in a broader sense to the updating of any number.

In operation, a starting address of a memory location to be accessed is received by multiplexer 16 over data bus 12. The CTR input of multiplexer 16 receives a control signal to select input IN2 and connect it to output OUT. Register P1 receives a signal on its LD input and the starting address is loaded into register P1. The address in register P1 is then provided to address bus 14. (Note that since only a single register P1 is used in this embodiment, the multiplexer 18 as well as the other registers P2–P4 may be eliminated.) As soon as the address appears on address bus 14, the address is incremented or updated in adder 20 to generate the next address on adder output OUT. The incrementing of the address takes place during the addressing cycle to memory. When the addressing cycle is complete, a control signal is received by the CTR input of multiplexer 16 to select its IN1 input. The next address on output OUT of adder 20 is then Loaded into register P1 upon receipt of a control signal on the LD input of register P1. The invention may also be practiced by connecting input IN1 to output OUT in multiplexer 16 prior to the conclusion of the addressing cycle to memory. The next address will again only be loaded into register P1 upon the receipt of a control signal at the LD input of P1.

The new or updated address in register P1 may now be provided to address bus 14, as described above, and the process repeated. It will be noted that there is virtually no waiting period from the time one addressing cycle is complete and the next address appears on address bus 14 to start the next addressing cycle. The preselected number added to the address on bus 14 at adder 20 will be determined from the arrangement of the system memory. For example, if sequentially numbered memory locations are addressed one at a time, adder 20 will increment the current address by one. If two memory locations are addressed by each address, adder 20 will increment the current address by two. Similarly, addresses may be decremented by a predetermined amount by employing a subtracter in place of adder 20.

The operation of system 10 with two registers P1 and P2 will now be described. Two registers can be used wherever two non-simultaneous counting operations take placed. The particular application that will be described is for an indirect addressing system. By way of background, in one type of indirect addressing system, the address and byte count of a data block is stored in a memory map (link) table in the system memory. In order to do a memory access, the address of the data block in the link table must first be provided so that the starting address of the data in each data block can be obtained. Subsequent data blocks may similarly have starting addresses located in sequential locations in the link table.

In such an indirect addressing system, the starting address of the data block in the link table is received by multiplexer 16 over data bus 12. The CTR input of multiplexer 16 receives a control signal to select input IN2 and connect it to output OUT. Register P1 receives a signal on its LD input and the starting address of the data block in the link table is loaded into register P1. The address in register P1 is then provided to address bus 14 by a control signal received on the CTR input of multiplexer 18 for connecting the IN1 input to output OUT of Multiplexer 18. As soon as the data block address appears on address bus 14, the address is incremented or updated in adder 20 to generate the next address on output OUT. The incrementing of the address takes place during the addressing cycle to the link table. With the starting or first data block address on address bus 14, the starting address of the data in the first data block is fetched from the link table and placed on data bus 12. This data starting address is then loaded into register P2 by a signal received by CTR input of multiplexer 16 connecting data bus 12 to its output OUT and by a signal received by the LD input of register P2. When the link table cycle is complete, a control signal is received by the CTR input of multiplexer 16 to select its IN1 input. The address of the next data block in the link table (on output OUT of adder 20) is then loaded into register P1 upon receipt of a control signal on the LD input of register P1.

Register P1 now has the address of the next data block in the link table, and register P2 has the starting address of the data in the first data block. The address in register P2 may now be provided to address bus 14 through multiplexer 18. The address in register P2 is provided to address bus 14 by a control signal received on the CTR input for connecting the IN2 input to output OUT. As soon as the address appears on address but 14, the address is incremented or updated in adder 20 to generate the next address on adder output OUT. The incrementing of the address takes place during the addressing cycle to memory. When the cycle is complete, a control signal is received by the CTR input of multiplexer 16 to select its IN1 input. The next address on output OUT of adder 20 is then loaded into register P2 upon receipt of a control signal on the LD input of register P2.

The next address in register P2 may be provided to address bus 14 and the process repeated until the last data location in the data block has been addressed. The address of the next data block in the link table which is in register P1 may then be provided to address bus 14 and the starting address of the data in the next data block fetched. The entire process can then be repeated until the starting addresses of data in each data block have been fetched from the link table and the data locations addressed.

Another application of the present invention is related to the foregoing example. Typically, the link table includes both the starting address of data in a data block as well as a byte count. The byte count is the number of addressable locations in the data block. As register P2 steps through the sequential locations for a given data block, the byte count must be decremented to keep track of the number of addressing cycles. A system similar to that shown in the figure may be utilized for keeping track of the byte count. However, a subtracter will be substituted for adder 20 and the number provided to bus 14 will not be an address but a count which will signal the number of data bytes in a data block yet to be addressed. If more than a single count must be tracked (for example, a byte count and the number of data blocks in the link table), more than a single register P1 will be utilized.

The specific embodiment shown in the figure has four registers P1–P4. This embodiment would have application for indirect addressing, as described above, but for two separate channels. For example, a DMA chip having two separate data storage systems to address.

The foregoing examples illustrate how the subject invention may be utilized for incrementing or tracking addresses and decrementing a byte and other data counts. In its broadest sense, the subject invention is a counting system or method for changing a plurality of numbers. The numbers may represent addresses or counts or other value that is incrementally changed either by adding or subtracting a preselected value therefrom.

It will be clear to those skilled in the art that the present invention is not limited to the specific embodiment disclosed and illustrated herein.

Numerous modifications, variations, and full and partial equivalents can be undertaken without departing from the invention as limited only by the spirit and scope of the appended claims.

What is desired to be secured by Letters Patent of the United States is as follows.

What is claimed is:

1. A counting system comprising:

first and second busses;

first and second registers, each having an input and output;

first and second multiplexers, each having first and second inputs and an output; and combining means having an output and a first input;

wherein the inputs of said first and second registers are connected to the output of said first multiplexer, the outputs of said first and second registers are connected to respective first and second inputs of said second multiplexer, the output of said second multiplexer is connected to said second bus and to the input to said combining means, the output of said combining means is connected to the first input of said first multiplexer, and said first bus is connected to the second input of said first multiplexer.

2. The system of claim 1 wherein said second multiplexer has a control input for connecting, within said second multiplexer, the first or second input of the second multiplexer to the output of the second multiplexer.

3. The system of claim 2 wherein each of said registers stores a number which is provided to said second bus when the output of the register storing the number is connected by the second multiplexer to said second bus.

4. The system of claim 3 wherein said combining means includes a second input for receiving a preselected number for combining with the number on said second bus.

5. The system of claim 4 wherein said combining means provides an updated number on its output by combining the numbers appearing on its inputs.

6. The system of claim 5 wherein said first multiplexer has a control input for connecting, within said first multiplexer, the first or second input of the first multiplexer to the output of the first multiplexer.

7. The system of claim 6 wherein said first bus provides a start number, and wherein said registers each includes a control input for receiving a signal to load said register with a number appearing on the output of said first multiplexer.

8. The system of claim 7 wherein said combining means is an adder.

9. The system of claim 7 wherein said combining means is a subtracter.

10. A system for tracking a plurality of addresses comprising:

a plurality of registers, each register storing a current address and having an input and an output, with each input being connected to a data bus through a first multiplexer and each output being connected to an address bus through a second multiplexer; and an adder connected between said address bus and an input of said first multiplexer for incrementing a current address appearing on said address bus to generate a next address.

11. The system of claim 10 wherein said data bus provides a starting address for each of said registers and wherein said first multiplexer has a control input for connecting the address from said data bus or said adder to said first multiplexer output, and wherein each of said registers includes a control input for receiving a signal to load said register with the address appearing on the output of said first multiplexer.

12. The system of claim 11 wherein said second multiplexer has a control input for selectively connecting one of said register outputs to said address bus.

13. The system of claim 12 wherein said adder includes an input for receiving a preselected number to increment the address on said address bus thereby providing the next address.

14. A method of tracking a plurality of addresses comprising:

a. loading an initial address of a first data block in a link table from a data bus into a first register;

b. providing the address in said first register to an address bus;

c. incrementing the data block address in an adder while said data block address is on said bus to generate a next data block address;

d. fetching a starting data address from said link table and placing it on said data bus, and loading said starting data address from said data bus into a second register;

e. loading said first register with said next data block address;

f. providing the address in said second register to said address bus;

g. incrementing said address in said adder while said address is on said address bus to generate a next address;

h. loading said second register with said next address; and i. repeating steps "f" through "h" a plurality of times.

15. The method of claim 14 further comprising:

j. repeating steps "b" through "e".

16. The method of claim 15 further comprising:

k. repeating steps "i" through "j" a plurality of times.

17. A method of changing a plurality of numbers comprising:

a. loading a first number into a first register;

b. providing the first number in said first register to a bus;

c. combining the first number on said bus with a first preselected number while said first number is on said bus to generate a next first number;

d. loading said first register with said next first number;

e. loading a second number into a second register;

f. providing the second number in said second register to said bus;

g. combining the second number on said bus with a second preselected number while said second number is on said bus to generate a next second number; and h. loading said next second number into said second register.

18. The method of claim 17 further comprising:

i. repeating steps "f" through "h" a plurality of times.

19. The method of claim 18 further comprising:

j. repeating steps "b" through "d" and "f" through "i" a plurality of times.

20. The method of claim 17 wherein said combining steps "c" and "g" each includes adding said preselected number to said first or second number, respectively.

21. The method of claim 17 wherein said combining steps "c" and "g" each includes subtracting said preselected number from said first or second number, respectively.

* * * * *